March 10, 1970   M. E. WENDT   3,500,087
DETACHABLE LUBRICANT RESERVOIR FOR DYNAMOELECTRIC MACHINE
Filed Nov. 4, 1968
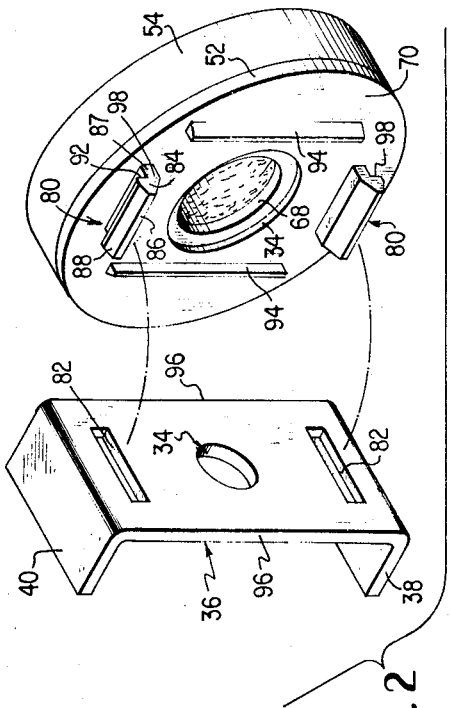
FIG. 2
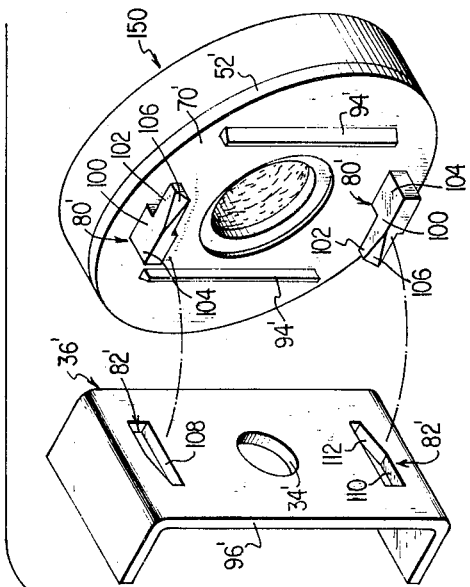
FIG. 3
FIG. 4
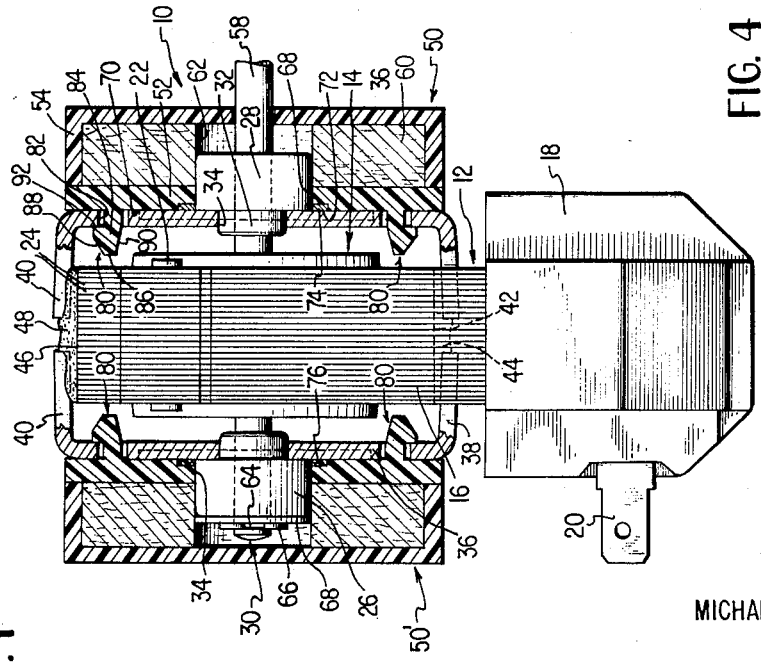
FIG. 1
INVENTOR
MICHAEL E. WENDT
BY John M. Stoudt
ATTORNEY United States Patent Office 3,500,087
Patented Mar. 10, 1970

3,500,087
DETACHABLE LUBRICANT RESERVOIR FOR DYNAMOELECTRIC MACHINE
Michael E. Wendt, Fort Wayne, Ind., assignor to General Electric Company, a corporation of New York
Filed Nov. 4, 1968, Ser. No. 772,914
Int. Cl. H02k 5/16
U.S. Cl. 310—90                                     7 Claims

ABSTRACT OF THE DISCLOSURE

A pair of deflectable, hooked projection means carried on the apertured plates of a lubricant retaining reservoir assembly for insertion in aligned slots of a dynamoelectric machine end frame for detachably coupling the lubricant reservoir in bearing receiving position thereon.

BACKGROUND OF THE INVENTION

This invention relates generally to an end frame bearing lubrication arrangement for small electric motors which employ sleeve bearings to support the rotor, and more particularly, to detachable coupling means for securing the lubricant reservoir to the end frame by a "straight push" in line with the rotor axis.

Small electric motors normally employ porous sleeve bearings which are carried by the end frames or shields of the motor on opposite sides of the stator core for supporting the rotor for rotation about an axis which is perpendicular to the longitudinal axis of the laminated stator core. The porous cylindrical bearing, in some cases, projects away from the outer surface of the end frame member. In order to maintain bearing lubrication over an extended period of time, lubricant reservoirs in the form of a substantially imperforate casing, carrying a lubricant-impregnated pad, surrounds the outer porous surface of the bearing and is in contact therewith.

One such type of lubricant reservoir motor is described in United States Patent 3,168,663, patented Feb. 2, 1965, entitled "Dynamoelectric Machine," to Joseph E. Baclawski and assigned to the common assignee. The machine of this patent employs a substantially imperforate casing which includes a circular or rectangular plate having an opening or hole formed therein of a diameter on the order of that of the porous bearing. The plate receives the porous bearing with a portion of its peripheral surface in contact with the lubricant-impregnated pads carried therein. Screws couple the lubricant reservoirs to the end frames which carry the rotor shaft and bearings and means are further provided for ensuring proper alignment and positioning of the bearing receiving opening of the lubricant reservoir about the cylindrical porous bearing.

SUMMARY

It is a primary object of the present invention to provide an improved attachable lubricant reservoir assembly to a motor frame carrying a sleeve-type bearing in which coupling and retention of the reservoir to the motor end frame is achieved without the need for threaded screws or the like.

It is a further object of this invention to provide an improved lubricant reservoir assembly of this type in which the attachment means also function as alignment means during mounting and subsequent thereto.

It is a further object of this invention to provide an improved lubricant reservoir assembly of this type in which the attachment means are integral with one of the imperforate casing members to reduce the cost, eliminate leakage of lubricant, and simplify the assembly.

In carrying out these objects, in one form, there is provided a small electric motor including a stator, a shaft having a rotor fixed thereto and an end frame carrying porous bearings supporting the rotor shaft for rotation with respect to the stator. A lubrication reservoir assembly in the form of a substantially imperforate casing enclosing a lubricant-impregnated pad is provided with an opening within one casing wall which receives the porous bearing. Elongated slots are provided within the motor end frame on each side of the porous bearing, and aligned, hooked projections, having original undeflected positions, are carried on the opposed surfaces of the lubricant reservoir assembly casing. A beveled contact surface on each projection deflects the hooked projection away from its original position during insertion into the recess. The hooked projection continues to deflect until its lip passes the inside edge of the end frame slot, whereupon the deflected hook tends to snap back toward its original position and locks its lip under the end frame.

In one form, the lubricant reservoir plate is of molded plastic and the paired flexible, hooked projections are integrally formed therewith. The beveled surface extends the length of the projection with the projection being rectangular in form and of a size on the order of the aligned end frame slot.

Surface projections are integrally formed within said plastic plate at right angles and extend at right angles to the hook projections for preventing rotation of the lubricant reservoir after snap coupling to the motor end frame.

In another form, the slots carried by the end frame have a tapered surface, whose plane is parallel to the rotor axis and the lubrication reservoir plate hooked projection is in longitudinal alignment with its slot. One lateral end is fixed to the contact surface and the outer edge of the laterally free end is beveled on the same side of the projection as is the tapered edge of the projection receiving slot carried by the end frame. In each case, rotational motion of the lubricant reservoir is limited by spaced, parallel, flat side projections which receive the edges of the end frame. The ends of the hooked projections are also in contact with the sides of the slots carried by the end frame to further prevent rotation.

The subject matter which is regarded as the invention is particularly pointed out and distinctly claimed in the concluding portion of this specification. The invention, both as to organization and method of operation, together with further objects and advantages thereof, may be best understood by reference to the following description taken in conjunction with the accompanying drawing.

BRIEF DESCRIPTION OF THE DRAWING

In the drawing:
FIGURE 1 is an elevational view, partially in section, of a small electric motor which embodies this invention in one form.

FIGURE 2 is a partially exploded, perspective view of the motor end shield and lubrication reservoir of the motor of FIGURE 1 illustrating the "straight push," press fit attachment of the lubricant reservoir to the motor end shield.

FIGURE 3 is an exploded, perspective view of a modified lubricant reservoir and motor frame for a small motor forming a second embodiment of the present invention.

FIGURE 4 is an enlarged, end view of a portion of the motor frame of FIGURE 3 with the hooked projection of the lubrication reservoir inserted within a tapered projection receiving slot.

DESCRIPTION OF THE PREFERRED EMBODIMENTS

Referring to the drawing, for the purpose of illustration, there is shown an electric motor 10 of the shaded pole type embodying one form of the present invention. Motor 10 includes a stator, indicated generally at 12, and a rotor 14, with the rotor being positioned between a pair of oppositely disposed pole faces carried by the main yoke section 16 of the stator. Rotor 14 operates as a result of energization of a stator coil 18 which is wrapped about the laminated stator 12 and is shown in encapsulated form. Energization is achieved by supplying alternating current to the stator coil 18 through stator terminals 20 which project therefrom. Suitable shaded coils, such as coil 22, formed of copper or the like, are carried by the stator 12 on one pole face. The core and the main yoke sections are respectively formed of a plurality of stacked laminations 24, while the rotor may be of the squirrel cage type. The rotor 14 is supported for rotation relative to the stator 12, and in this respect, a pair of sleeve-type bearings 26 and 28 are fixed to motor end frames or shields 36 on the left and right-hand sides of the rotor, respectively. Each bearing preferably comprises relatively porous sintered material with the inner end 32 of reduced diameter, positioned within bearing receiving holes or openings 34 of the motor end frames 36. Each end frame consists of a U-shaped bracket formed of non-magnetic material, preferably lightweight aluminum. The lower legs 38 of the bracket frame members are received within an axially extending slot 42 formed within the laminate stator 12 and fixed thereto by suitable cement 44, while the upper legs 40 of each of the frame members are attached to the upper surface 46 of the yoke section 16 of stator 12 by the same cement 48 in similar fashion. Preferably, the small diameter inner ends of the porous sleeve bearings 26 and 28 are staked to the end frame or shield 36 in the area of the openings provided at the center of each bracket. The staking is done under considerable pressure and forms a permanent mount between the sleeve-type bearing and its respective end bracket. The positioning of the end brackets with respect to the stator 12 must be such that the sleeve-type bearings 26 and 28 are accurately aligned so that the rotor rotates about an axis common to both bearings and without interference with fixed stator 12.

The porous bearings 26 and 28 are lubricated and in turn, the lubricant to the surfaces of the rotor shaft 30 which passes therethrough by the improved, simplified and low cost detachably coupled lubricant reservoir assemblies 50 and 50' of the present invention. The lubricant reservoir assembly consists, in general, of a substantially imperforate casing formed by an apertured, circular plastic plate member 52 to which is coupled an imperforate cup-shaped cover 54 of similar plastic material, which in the case of assembly 50 includes a small diameter central opening 56 through which projects the output end 58 of the rotor shaft 30. The third component of this assembly is a lubricant retaining element 60 in the form of an annular disk-shaped pad which is enclosed within cover 54 for both its protection and the prevention of evaporation of the lubricant carried thereby. The pad 60 may be impregnated with a suitable lubricant oil with pad carrying a central recess 62 of a diameter corresponding to that of the porous sleeve-type bearing 28. Thus, there is peripheral surface contact between these elements to allow the sleeve-type bearing 28 to remove lubricant, as needed, from the pad and deliver the same to the journal surfaces adjacent rotor shaft 30. During operation, lubricant seepage from the pad to the journal surface of the porous sleeve-type bearing occurs at a very slow rate, for instance, on the order of 1/10 of a cubic centimeter per one thousand hours of operation. On the left-hand side of the motor, a lubricant reservoir assembly 50' is provided for porous bearing 26 which is identical in configuration but is not provided with an opening within its cover since the rotor shaft 30 does not project therethrough. As a matter of fact, the left-hand end of the rotor shaft 30 carries a peripheral slot 64 which receives a split locking ring 66 to locate washer 68 and porous bearing 26 axially with respect to this end of the shaft.

The plate member 52 for assembly 50, for instance, is provided with a central opening 68 of a diameter comparable to the diameter of recess 62 within the lubricant impregnated pad 60, the opening 68 receiving a portion of the porous sleeve-type bearing 28. Further, the outer contact surface of this plate 52 carries an annular recess 72 holding a peripheral seal 74 for preventing escape of lubricant from between the porous bearing and the inner peripheral edge of the plate member 52 during motor operation. A like seal 76 is carried by the left-hand lubricant reservoir assembly 50'. The pad 60, the plate 52 and the cover 54 are suitably coupled together by adhesive, ultrasonic welding, or the like subsequent to insertion of the lubricant impregnated pad 60.

The present invention is directed to the arrangement for the snap fit, "straight push" attachment of the lubricant reservoir assembly to the U-shaped bracket or end frame. Such an arrangement, in one form as shown in the exploded perspective view of FIGURE 2, for instance, lubricant reservoir assembly 50, is detachably coupled in abutting fashion to the end frame or shield 36 through the employment of integrally formed, deflectable hook projections, indicated generally at 80, which are received within elongated slots 82 carried by the end frame on either side of the bearing receiving opening 34. The projections 80 are in the form of integral, elongated, rigid, plastic hook portions 84 and a reduced thickness coupling portion 87.

Flexibility of the integral projection 80 is provided primarily by the thin flexible or resilient body of the apertured circular plastic plate 52 which allows the projection 80 to be deflected about its longitudinal axis in the vicinity of the plane formed by contact surface 70 of the plate member 52. It has been found in actual practice that for fractional horsepower size motors having lubricant reservoir assemblies constructed in accordance with the illustrated embodiment, a thickness not substantially greater than 0.030 inch (30 mils) is sufficient for the flexible body to provide the desired flexibility, and a thickness of ten mils is quite satisfactory. By forming coupling portion 87 of projection 80 with a reduced thickness, a slight amount of flexibility may be furnished directly to the integral projection itself, as well as to the plate body.

In this respect, a rather narrow leading edge 86 of the plastic hook projection is of a height which is less than the corresponding height of the end shield slot 82. An outer beveled surface 88 cooperates with an inner beveled surface 90 such that upon insertion of the hook-shaped projection 80 into slot 82, the trailing edge 92 or lip locks itself under end shield 36. The flexible body of plastic plate 52 flexes when an inclined load is applied to the hook to permit the hooked body to be deflected inwardly, away from its original, undeflected position, compressing itself in height as it rides up on the incline provided by beveled surfaces 88 and 90 as these surfaces engage the longitudinal edges of slot 82. The hooked body continues to deflect away from the original position until its lips 92 passes the inner edge of the end shield. At this position, the hook tends to snap back toward its original position and locks its lip under the end frame into a coupled position with the frame. Rotational motion of the lubricant reservoir assembly 50 is limited by the inclusion of a pair of straight-edge projections 94 which abut the edges 96 of the end frame during coupling and by the flat ends 98 of hook projection 80. Once attached, any pull off motion tending to separate the reservoir from the associated end shield is resisted by the hook lip which is engaged under the end shield. While the embodiment of FIGURES 1 and 2 employs opposed beveled surfaces to achieve the desired flexing insertion, it is only necessary to provide one surface with a bevel such that during insertion, the hook is deflected from its initial position to permit its passage through the elongated slot 82. It is important to note that the left-hand lubricant reservoir assembly 50' is attached to its end frame or shield 36 in the identical manner as is the assembly 50.

Reference to FIGURE 3 shows an alternate embodiment of the present invention in which case, end shield or frame 36' is provided with a central opening 34' for receiving a porous sleeve-type bearing (not shown) carried by a motor shaft of a construction identical with that of the embodiment of FIGURE 1. Again, a lubricant reservoir assembly 150 of similar configuration to that of FIGURES 1 and 2 is adapted for push fit, detachable attachment to the end frame by a straight push technique. The principal difference resides in the configuration of the paired, elongated slots 82' of the end shield or frame 36' and the configuration of the integrally formed, rigid plastic hook projections 80' of the lubricant reservoir assembly. From contact surface 70' of the reservoir casing plate 52', the integrally cast plastic hook projections 80' instead of being flexed about a line which extends parallel to the longitudinally extending receiving slot 82' flexes about the junction area 100 which separates the reduced thickness tip 102 of the projection from the larger rectangular base section 104. Both the height and thickness of section 102 is reduced and further, the outer edge 106 is beveled to provide the desired camming surface for achieving flexure of the free end 102 during insertion of the projection 80' within slot 82'. The paired projections 80', which are diametrically opposite each other and located at some distance from the bearing receiving holes 68', move into specially formed and aligned opening slots 82'. In this respect, while the inner surface 108 of the upper slot 82' is flat, the outer surface 110 is provided with a tapered portion 112 causing an area of reduced slot height at the left-hand end of the slot, as seen in FIGURE 4. During coupling, the beveled or tapered surface 106 contacts the tapered upper surface 112 of the slot 82 and therefore, the free end 102 of the flexible, hooked projection flexes downwardly about the flexing area 100 until the rear edge or lip 114 snaps back as it passes the inside edge of the slotted end shield. Again, straight edge side projections 94' are carried by the plate 52 which project outwardly from the contact surface 70' and during coupling, have their sides engage the edges 96' of the bracket to locate the lubricant reservoir assembly on the bracket or end frame and prevent rotation of the same subsequent to assembly. Again, removal by a pull off motion of the lubricant reservoir assembly along the rotor shaft axis is resisted by the hooked lip 102 engaging the inner surface of the end frame adjacent the tapered opening edge 112.

From the above, it is apparent that the low cost, simplified lubricant reservoir assemblies, consisting of a plastic casing carrying the lubricant impregnated pad, may be readily manufactured as a subcomponent for easy attachment to a completed motor assembly by the simple process of a push fit in which the hook projections which are integral with one casing wall merely snap into preformed slots or recesses carried by the motor end frame or shield. While these casing elements, comprising the plate cover, have been described as being formed of molded plastic, including the rigid plastic hook and resilient base as integral projections, these parts may be formed of materials other than plastic as long as they exhibit the required flexibility and/or deformability during insertion and rigidity after insertion to ensure proper coupling and retention of the same.

It should be apparent to those skilled in the art that while I have described what, at present, is considered to be the preferred embodiments of this invention, in accordance with the patent statutes, changes may be made in the disclosed apparatus without actually departing from the true spirit and scope of this invention.

What is claimed is new and it is desired to secure Letters Patent of the United States:

1. In a dynamoelectric machine having a stator, a shaft having a rotor fixed thereto, a frame member carrying at least one bearing for supporting said rotor shaft for rotation with respect to said stator and a detachable lubricant retaining reservoir assembly for supplying lubricant to said bearing and including a plate member carrying a hole for receiving said bearing, the improvement comprising: slot means carried by one of said members and aligned hook projection means carried by the opposed surface of said other member having an original position, said hook projection means being received within said slot means by deflecting at least said other member or said hook projection means during insertion, with the hook projection means moving away from the original position and becoming coupled to said slot means.

2. The dynamoelectric machine as claimed in claim 1 wherein said slot means comprises; paired, parallel, elongated, rectangular slots formed within said frame member on either side of said rotor shaft bearing and said hook projection means comprises; paired, elongated members aligned with said paired slots and including a reduced inner section forming a flexible base and a thickened outer section forming a latching lip and a tapered leading edge outwardly of said lip and extending the length thereof, whereby said tapered leading edge facilitates insertion within said aligned slots with limited deformation thereto.

3. The dynamoelectric machine as claimed in claim 2 wherein the length of said hook projection means is equal to the length of said rectangular slot to prevent rotation of said lubricant reservoir assembly subsequent to coupling to one of said frame members.

4. The dynamoelectric machine as claimed in claim 1 wherein said lubricant retaining reservoir assembly comprises a casing including a plastic plate having said hook projection means integrally molded therewith.

5. The dynamoelectric machine as claimed in claim 4 wherein said frame member comprises a U-shaped bracket, rectangular in form and wherein said molded plastic base plate of said lubricant reservoir assembly includes integral, molded, spaced and parallel, flat edged projections at right angles to said hook projection means for edge abutting contact with the sides of said U-shaped bracket end frame for preventing rotation of said lubricant reservoir assembly on said frame member subsequent to coupling therewith.

6. The dynamoelectric machine as claimed in claim 1 wherein said slot means carried by said frame member comprise at least one elongated slot positioned to one side of said rotor shaft bearing and having a tapered longitudinal surface, and wherein said hook projection means comprises a deflectable projection, rectangular in form, carried on the face of said lubricant reservoir assembly plate, in alignment with said elongated slot, and includes a rectangular base section extending from the surface of said plate, and a laterally offset section of reduced thickness spaced from the end frame member contact surface of said plate to form a frame member engaging lip, with one leading edge of said laterally offset section being beveled to facilitate deflection of said laterally offset section during insertion of said projection within said slot.

7. The dynamoelectric machine as claimed in claim 6 wherein said plate member of said lubricant reservoir assembly is formed of plastic, and said hook projection means is integrally molded therewith.

References Cited

UNITED STATES PATENTS

| | | | |
|---|---|---|---|
| 2,845,552 | 7/1958 | Robinson | 310—90 |
| 2,959,696 | 11/1960 | Tupper et al. | 310—90 |
| 3,168,663 | 2/1965 | Baclawski | 310—90 |
| 3,270,227 | 8/1966 | Kaeding | 310—90 |

WARREN E. RAY, Primary Examiner